United States Patent [19]
Cullum

[11] Patent Number: 5,709,522
[45] Date of Patent: Jan. 20, 1998

[54] TOW TRUCK WITH DOUBLE PIVOT CROSSBAR

[75] Inventor: John M. Cullum, Memphis, Tenn.

[73] Assignee: Vulcan International, Inc., Olive Branch, Miss.

[21] Appl. No.: 535,528

[22] Filed: Sep. 28, 1995

[51] Int. Cl.[6] ................................................ B60P 3/12
[52] U.S. Cl. ................................................ 414/563; 280/402
[58] Field of Search ............................ 414/563, 718; 280/402

[56] References Cited

U.S. PATENT DOCUMENTS

| | | |
|---|---|---|
| 2,795,435 | 6/1957 | Ortiz et al. ............ 414/563 X |
| 3,019,033 | 1/1962 | Wegener et al. ........ 414/563 X |
| 3,048,286 | 8/1962 | Sprague ................. 414/563 |
| 3,152,814 | 10/1964 | Wegener et al. ........ 414/563 X |
| 4,212,483 | 7/1980 | Howard . |
| 4,611,968 | 9/1986 | Casteel ................. 414/563 |
| 4,674,943 | 6/1987 | Nespor . |
| 4,679,978 | 7/1987 | Holmes et al. . |
| 4,761,083 | 8/1988 | Smith et al. . |
| 4,797,057 | 1/1989 | Soup et al. . |
| 4,836,737 | 6/1989 | Holmes et al. . |
| 4,861,221 | 8/1989 | Krisa . |
| 4,927,315 | 5/1990 | Nespor . |
| 5,142,800 | 9/1992 | Hales et al. . |
| 5,267,618 | 12/1993 | Harrell . |
| 5,269,553 | 12/1993 | Alonso . |
| 5,326,216 | 7/1994 | Russ . |
| 5,332,248 | 7/1994 | Higginbotham . |
| 5,336,037 | 8/1994 | Curten et al. . |
| 5,348,329 | 9/1994 | Morin et al. . |
| 5,352,083 | 10/1994 | Roberts et al. . |
| 5,395,182 | 3/1995 | Rossburger . |
| 5,400,859 | 3/1995 | Harrell . |
| 5,405,200 | 4/1995 | Sumiyoshi et al. . |
| 5,529,454 | 6/1996 | Alm et al. ............. 414/563 X |
| 5,540,540 | 7/1996 | Peterson .............. 414/563 |

FOREIGN PATENT DOCUMENTS

| | | |
|---|---|---|
| 2690883 | 11/1993 | France . |
| 2169580 | 7/1986 | United Kingdom . |
| 2238290 | 5/1991 | United Kingdom . |

OTHER PUBLICATIONS

Vulcan Wheel Snatcher Brochure, Apr. 1990.
Oshkosh, M984E1, 4 pages of description, pictorials, and drawings.
Bargningsbilar EKA AB, Eka D2030, 1 page drawing and parts list.

*Primary Examiner*—James W. Keenan
*Attorney, Agent, or Firm*—Niro, Scavone, Haller & Niro

[57] ABSTRACT

An improved towing device including a crossbar capable of rotational movement in both horizontal and vertical planes, permitting stress reduction in both the tow truck assembly and tow truck chassis during recovery of a disabled vehicle.

18 Claims, 6 Drawing Sheets

TOW TRUCK WITH DOUBLE PIVOT CROSSBAR

BACKGROUND OF THE INVENTION

The present invention relates to an apparatus for lifting and towing vehicles. More particularly, the present invention relates to an improved lifting and towing apparatus employing a crossbar capable of both horizontal and vertical rotational movement.

In recent years, the design problems confronting those in the towing apparatus industry have become increasingly complex. It is essential not only to design a safe, reliable and cost-effective product, but also to accommodate the increasingly difficult constraints imposed by changes in the design of many modern automobiles. For example, current automotive design emphasizes shock-absorbing bumpers, and a variety of non-metallic or otherwise fragile parts, and present automobiles employ spoilers, low ground clearance, and small clearances between wheel wells and tires. These features present serious difficulties when a modern automobile is disabled and must be towed. Fragile parts and low ground clearance make recovery of the disabled vehicle more difficult and time-consuming. Problems are also presented when the tires of the disabled vehicle are (for example) positioned adjacent obstructions, such as curbs.

U.S. Pat. Nos. 4,637,623 and 4,798,509 ("the '623 and '509 patents"), the disclosures of which are incorporated by reference herein, each disclose wheel lift apparatus that are both horizontally and vertically movable and that have largely solved these problems, and have been a huge commercial success.

There is still room for improvement, however, particularly with respect to the recovery of disabled vehicles that must be towed over uneven or shifting surfaces, such as hilly terrain or sand, that place a great deal of stress on the recovery vehicle, and its disabled-vehicle-engaging components.

Conventional tow trucks employing a "wheel lift" vehicle engaging device characteristically employ an underlift device with a rearwardly-extending telescoping beam or "stinger." The stinger is typically attached at its rearward end to a transversely extending "crossbar." The crossbar is, in turn, connected to a vehicle engaging device, such as a wheel lift or a lifting fork. It has also become conventional (as taught in the '623 and '509 patents) to provide a pivot assembly associated with the crossbar that permits the crossbar to be rotated in a horizontal plane. This permits the disabled vehicle to turn when the tow truck turns. It also facilitates engagement of the disabled vehicle, since the tow truck need not be positioned directly in line with the disabled vehicle.

When (for example), a tow truck is required to tow a heavy vehicle across rough terrain, it is also desirable to permit the crossbar to move vertically, in order to reduce stress both in the tow truck assembly, and in the truck chassis to which the tow truck assembly is affixed.

However, no known prior art tow trucks employ crossbars that are capable of movement in both horizontal and vertical directions, with the exception of a prior art lifting device manufactured by a Swedish company, Bargningsbilar Eka AB ("the Eka device"). The Eka device includes a swivel lifting bar with a horizontal crossbar, and a vertically extending yoke. The yoke is rigidly connected to a rearwardly extending boom or stinger. A connecting pin and retaining rings are used to rotatively connect the crossbar and the yoke. A lifting fork can then be placed within apertures on opposing end portions of the crossbar. The swivel lifting bar thus permits the crossbar of the Eka device to rotate in a vertical plane, while the yoke can be rotated in a horizontal plane.

However, there are a number of disadvantages with the Eka device. For example, it does not permit the crossbar to be located immediately adjacent the ground. Instead, with the Eka device, the yoke is located above the stinger, and the crossbeam rests on the yoke. Also, the the Eka device was not designed for use with wheel lift towing devices. Further, it was found that during operation of the Eka device portions of the stinger could interfere with movement of the crossbeam. Once the crossbar was pivoted about its connecting pin so as to contact the sides of the stinger, further rotation of the crossbar could place a substantial torque on the lower, straight portion of the yoke. Failure of the lower portion of the yoke could result in the loss of both the crossbeam and the disabled vehicle.

Accordingly, there is a need for a tow truck having a crossbar movable in both vertical as well as horizontal planes. There is also a need for this crossbar to be positionable immediately adjacent the ground, to be structurally safe, and to be readily adaptable for use with various vehicle engaging devices, including wheel lifts, vehicle lifting forks, and other devices.

SUMMARY OF THE INVENTION

The present invention preserves the advantages of existing towing devices. It also provides new advantages not found in currently available towing devices, and overcomes many of the disadvantages of currently available devices.

The invention is generally directed to an apparatus associated with a towing vehicle for use in lifting and towing a towable vehicle, and includes a longitudinal boom extending rearwardly from the towing vehicle. A support beam is positionable below the towable vehicle and extends transversely to and substantially coplanar with the boom. The support beam is rotatively connected to the boom by first and second pivot assemblies. The first pivot assembly permits the support beam to rotate about a horizontal axis substantially colinear with the boom. The second pivot assembly is located in substantially the same horizontal plane as the first pivot assembly and permits the support beam to rotate about a vertical axis.

In a preferred embodiment, the first pivot assembly includes a support plate for mounting the crossbeam. The support plate is connected to a shaft rotatively connected to a rear portion of the boom. The first pivot assembly also includes at least two spaced bearings, and a housing located at a rear portion of the boom and at least partially enclosing the shaft and the bearings.

In another preferred embodiment, the present invention employs vehicle engaging devices that include lifting forks.

In yet another preferred embodiment, the present invention employs vehicle engaging devices of the "wheel lift" variety for engaging the wheels of a towable vehicle. These wheel lift devices include two wheel support members, each having an elongated arm and a wheel retainer, and two collars. The collars enable the wheel support members to be mounted to opposing end portions of the support beam such that the arms are in a generally horizontal orientation. The collars also permit the wheel support members to be generally horizontally rotated from a laterally remote position spaced outwardly from the sides of the towable vehicle to a vehicle lifting position immediately adjacent to the outer sides of a pair of wheels on the towable vehicle.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Figures 1, 2:
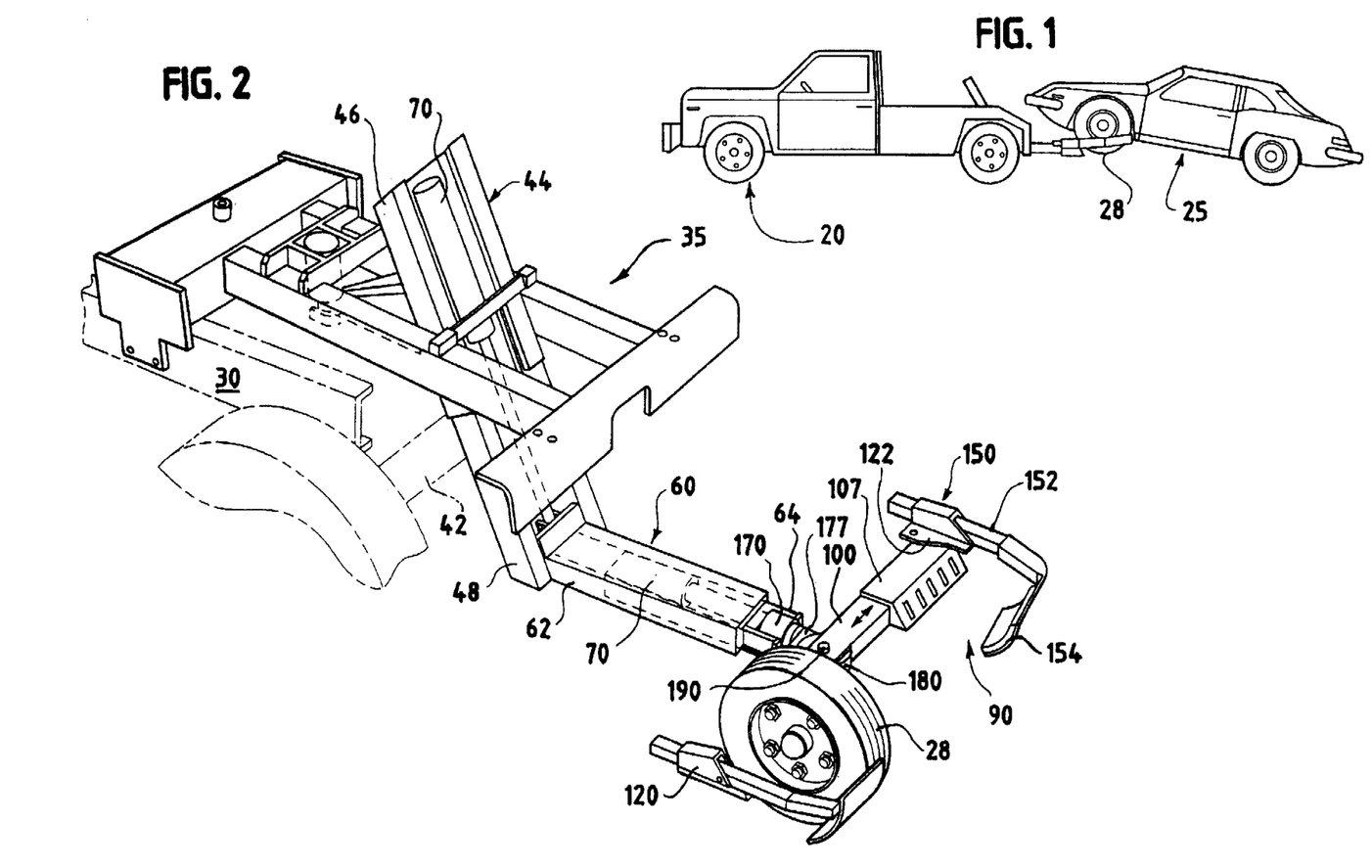
FIG. 1 is a side view showing the present invention, mounted on a vehicle, towing a disabled vehicle.
FIG. 2 is a perspective view of the invention mounted on a truck (shown in partial phantom) and shown supporting one wheel of a towed vehicle, the remainder of which is not shown.

The present invention may be mounted on any suitable vehicle. FIG. 1 shows a truck 20 towing a vehicle 25 by supporting the front wheels 28 of the towed vehicle 25. Though not shown, the towing apparatus may alternatively support the rear wheels of the vehicle 25.

Referring to FIGS. 3–7, the present invention will now be described, first with regard to the novel vertical pivot assembly 130 that permits crossbeam 100 to be rotated in a vertical plane about boom 60.

Figure 3:
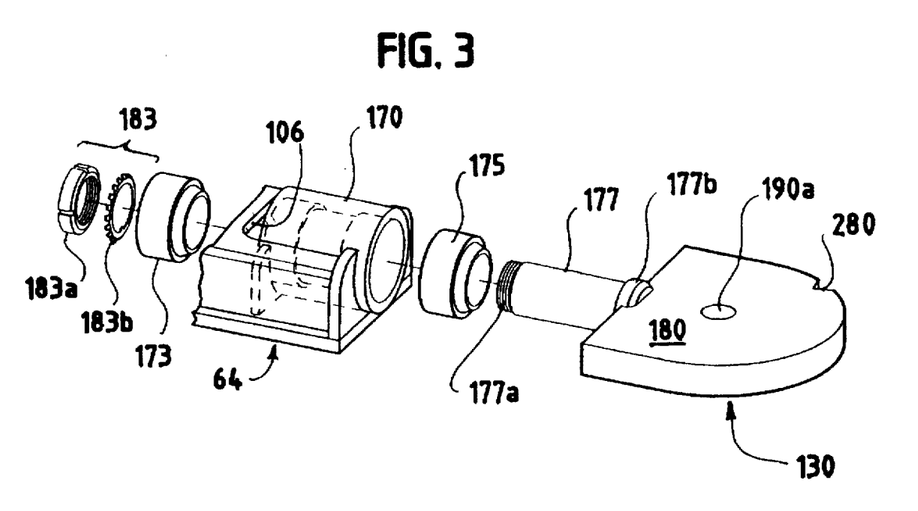
FIG. 3 is a partial side view of one embodiment of the vertical pivot assembly of the present invention.

Referring first to FIG. 3 (an embodiment also shown, in less detail, in FIGS. 7 and 11), one preferred embodiment of the vertical pivot assembly 130 of the present invention is disclosed. Inner boom member 64 includes supports 104 and a recessed portion 106, permitting slightly over-sized bearing sleeve or housing 170 to be rigidly housed within boom member 64. Bearing sleeve 170 is welded or otherwise rigidly connected to recessed portion 106. (Alternatively, sleeve 170 can be integrally constructed so as to form a rear portion of boom 60.) Spherical bearings 173 and 175 are positioned within either end of bearing sleeve 170, as shown in phantom in FIG. 3. A cylindrical threaded pin 177 is rigidly connected at a rearward end 177b to vertical pivot plate 180. Threaded forward end 177a of pin 177 passes through bearing sleeve 170 and spherical bearings 173 and 175, and is threadably secured to threaded nut 183a of nut-and-tab washer 183. Annular locking washer 183b fits within a groove (not shown) on threaded forward end 177a, thus locking threaded nut 183a on end 177a.

Vertical pivot assembly 130 of FIG. 3 thus permits vertical pivot plate 180 to rotate about a horizontal axis substantially colinear with boom 60, while longitudinal movement of pin 177 with respect to bearing sleeve 170 (which would otherwise be caused by braking or acceleration of the tow truck during towing of the disabled vehicle) is limited.

Figure 4:
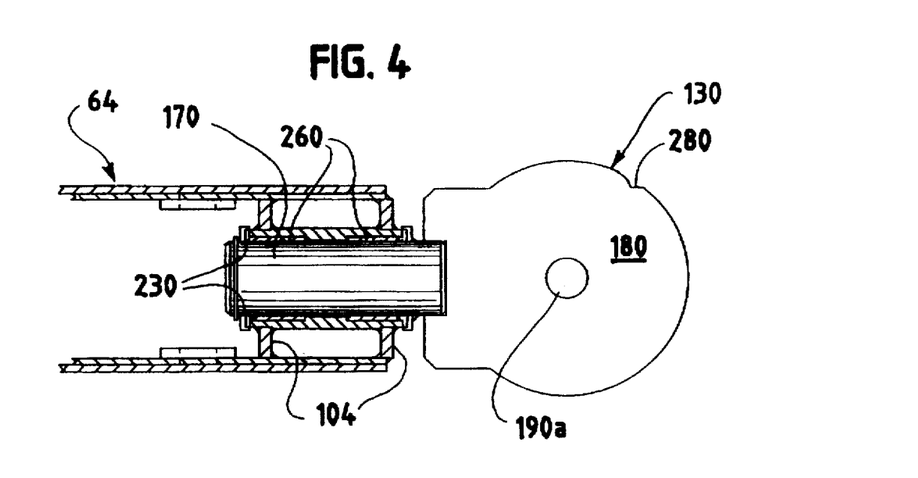
FIG. 4 is a top partial view of a third embodiment of the vertical pivot assembly of the invention.
Figure 5:
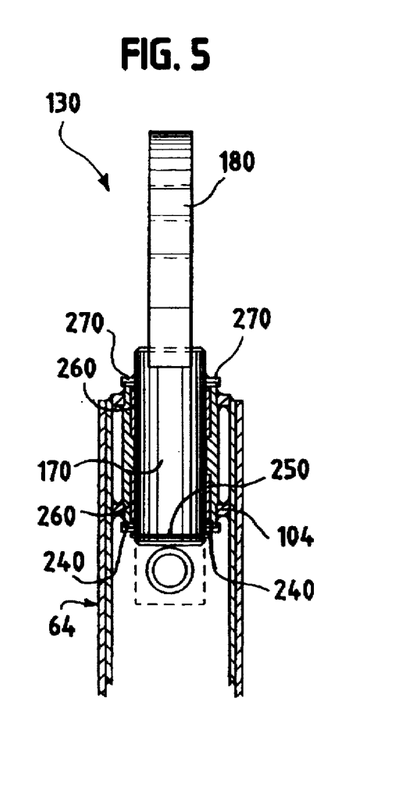
FIG. 5 is a partial side view similar of the embodiment shown in FIG. 4.
Figure 6:
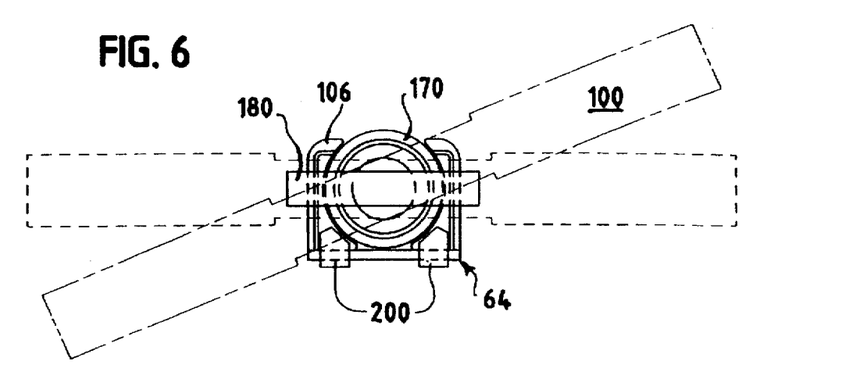
FIG. 6 is a partial front view of the assembled invention, showing the crossbar pivoting in a vertical plane.

Another embodiment of the vertical pivot assembly of the present invention is illustrated in FIGS. 4 and 5. In this embodiment, a sleeve 170 is still used, but the spherical bearings are replaced by bronze bushings 260. Retaining ring 250 functions in a manner similar to nut-and-tab washer 183, and limits the axial movement of plate 180 with respect to bearing sleeve 170. Thrust washers 240, which engage shoulders or caps 270, prevent axial loads (transferred through plate 180 from the disabled vehicle) from causing plate 180 to contact or damage bearing sleeve 170 or inner boom member 64, during braking of the tow truck. O-seals 230 prevent dirt or grit from entering bronze bushings 260. Bronze bushings are preferred, since they will tend not to seize against steel.

The different embodiments of vertical pivot assembly 130 disclosed in FIGS. 3 and 4 permits rotation of vertical pivot plate 180 about a horizontal axis extending substantially colinear with boom 60. With either embodiment, and referring now to FIG. 7, crossbeam 100 can also be rotated about a vertical axis, as will now be described. Crossbeam 100 includes horizontal pivot plate 100a, which is rigidly connected to crossbeam arms 100b. (Of course, crossbeam 100 may consist of one integral piece, rather than separate plate 100a and arms 100b.) Horizontal pivot plate 100a is pivotally connected at pivot pin 190 to vertical pivot plate 180. Pivot pin 190 passes through aperture 190a within vertical pivot plate 180. Accordingly, crossbeam 100 can be rotated in a horizontal plane about pivot pin 190. In addition, referring to FIG. 6, vertical pivot plate 180 can also be rotated in a vertical plane since pin 177 can be rotated within bearing sleeve 170. It will thus be noticed that vertical pivot assembly 130 is in substantially the same horizontal plane as pivot pin 190 and pivot plate 180.

Figure 7:
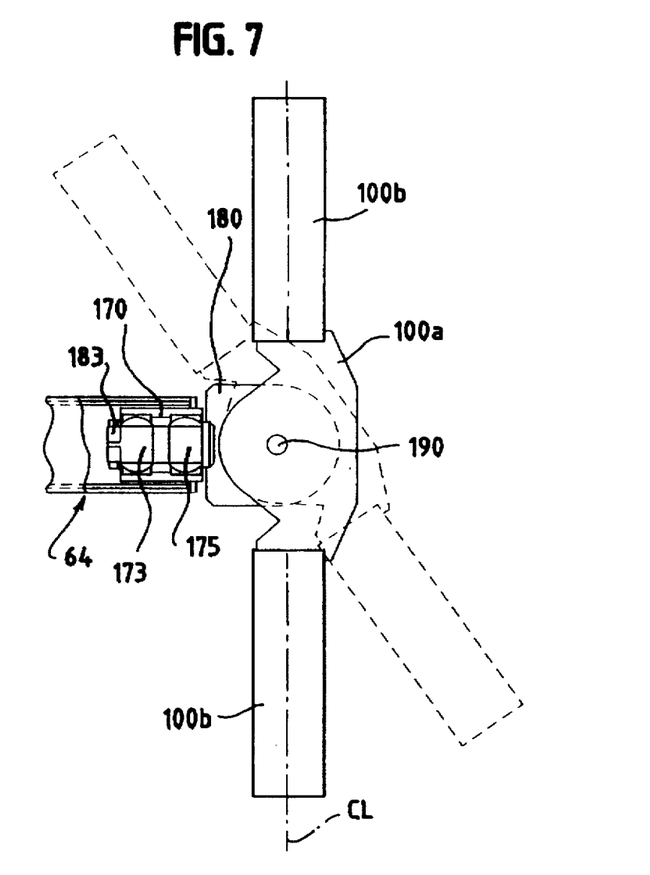
FIG. 7 is a partial top view similar to FIG. 6, showing the crossbar pivoting in a horizontal plane.

Pivot pin 190 is preferably located substantially near centerline "CL" of crossbeam 100 shown in FIG. 7. This will minimize the moment arm acting at the pivot connection about CL that would otherwise be created by attaching crossbeam 100 to pivot plate 180 at a point distant from centerline CL of crossbeam 100. ("Substantially near," as used here, means a location sufficiently adjacent the centerline CL so that this moment arm will not affect the use, operation or safety of the crossbeam in operation.)

Stop tabs 200 can also be employed (shown connected to end 104 of inner boom member 64) to limit the vertical rotation of crossbeam 100. It will be appreciated that if stops 200 are damaged or removed, the vertical pivot assembly should remain intact.

It will also now be appreciated that the present invention permits the use of a vertical pivot assembly integrally constructed with the crossbar. With this integral design, crossbeam 100 can be pivoted in a vertical plane about an axis substantially colinear with boom 60, and can also be pivoted in a horizontal plane about an axis substantially coplanar with the plane intersecting boom 60 and vertical pivot plate 180.

During movement of a tow truck following engagement with a recovery vehicle, including braking and acceleration of the tow truck, pin 177 will have a tendency to move forward or rearward with respect to bearing sleeve 170. (As used here, "forward" means in a direction toward the cab of the towing vehicle, and "rearward" means in a direction away from the cab of the towing vehicle.) This longitudinal movement is a source of wear decreasing the useful life of vertical pivot pin assembly 130. Spaced spherical bearings 173 and 175 have been found useful to absorb these longitudinal forces. Spaced bearings 173 and 175 are preferably spherical and made of hardened steel. These bearings are required to undergo both axial and radial loads, and spherical bearings, which can withstand forces in different directions, have been found particularly useful. Different bearing shapes, types or sizes can be used. The bearings are preferably sealed to reduce the introduction of dust, sand or grit, particularly in windy or desert-like conditions.

Alternative arrangements can be substituted for the dual-spaced bearings disclosed in FIG. 3. For example, a single bearing or, alternatively, bushings (as shown in FIG. 4) can be used. In another alternative (though not preferred) embodiment, the threaded portion of pin 177 could be connected directly to a corresponding threaded portion on the interior of bearing sleeve 170, without utilizing any bearings or bushings; of course, a nut-and-tab washer 183 (as shown in FIG. 3), a retaining ring 250 (as shown in FIG. 7) or equivalent structure would still be required to retain pin 177 in position within bearing sleeve 170. However, these alternative arrangement are not preferred, since it has been found that the use of two or more spaced bearings increases the useful life of the vertical pivot assembly.

Figure 8:
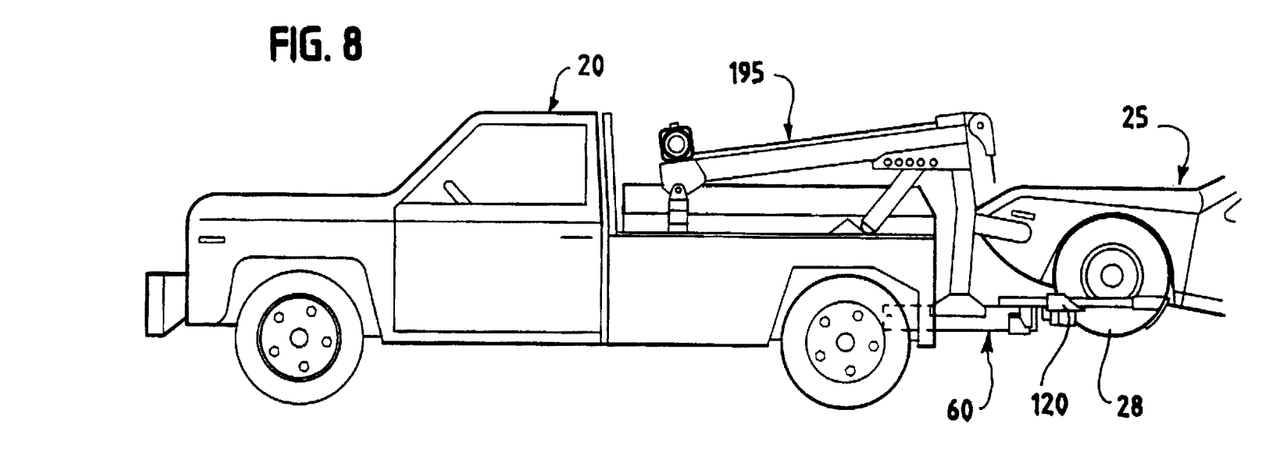
FIGS. 8 and 9 are side views illustrating use of the present invention, mounted on a vehicle, and towing a disabled vehicle using different vehicle engaging devices, including wheel lifts and lifting forks, respectively.
Figure 9:
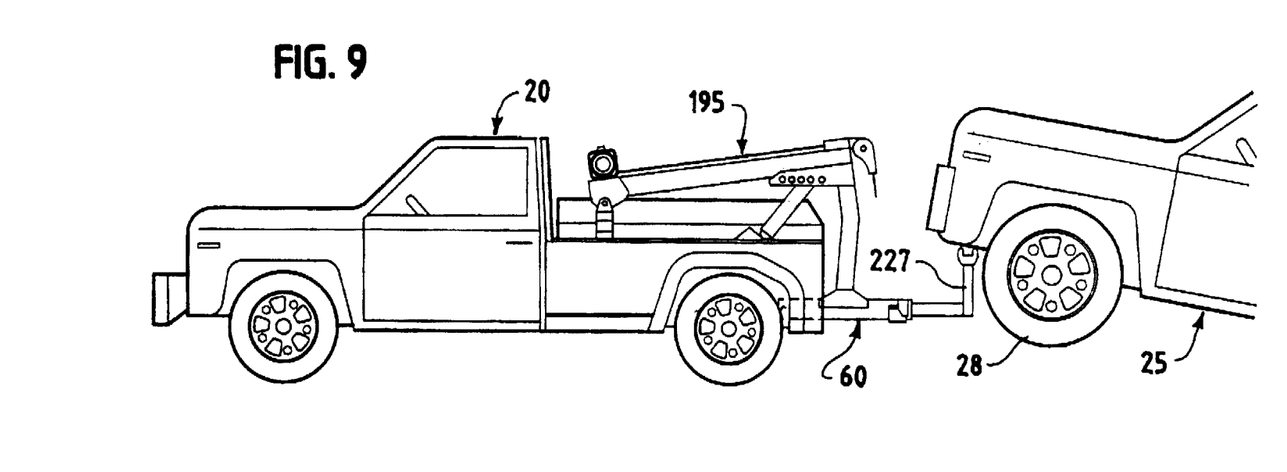

Referring to FIGS. 8 and 9, the present invention can be used with a boom structure 195 connecting tow truck 20 to stinger 60. Stinger 60 can then be connected to various vehicle engaging devices, including either wheel lift 90 (FIG. 8) or lifting fork 227 (FIG. 9).

Figure 10:
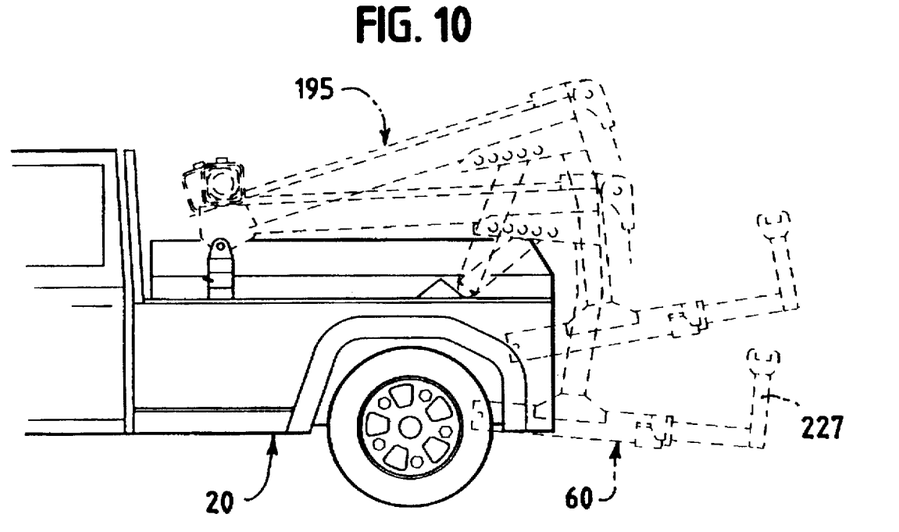
FIG. 10 is a partial side view, similar to FIG. 9, illustrating movement of the boom of the present invention.

During recovery of a disabled vehicle, stinger 60 and a vehicle engaging device such as lifting fork 227 can be moved to a variety of locations, as shown in FIG. 10. The presence of the double pivot crossbar 100 of the present invention will not inhibit the recovery movements of the stinger and the vehicle engaging device. However, it may be desirable to provide an enhanced frictional engagement between pivot pin 177 and crossbar 100, requiring a certain initial force in order to rotate the crossbar in a vertical direction. For example, as those of skill in the art will understand, notch 280 in plate 180 can be used to accommodate a tension spring, spring-loaded ball bearing, or similar device which will require the exertion of an increased pressure on crossbeam 100 before crossbeam 100 can be rotated about pivot pin 190a. This will ensure that slight forces on crossbeam 100 will not rotate the crossbar in an undesirable fashion during hook-up or transport of the disabled vehicle.

Figure 11:
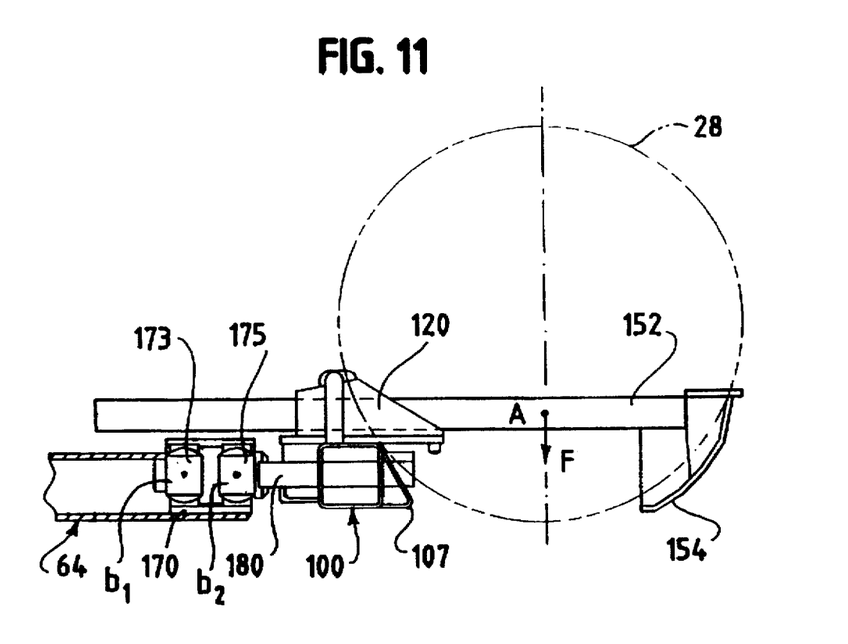
FIG. 11 is a partial side view of an embodiment of the present invention connected to a wheel lift device.

Referring to FIG. 11, several aspects of the geometry of the present invention will now be explained. "X" is the distance between the centerlines of bearings 173 and 175. "Y" is the distance between the centerline of disabled vehicle wheel 28 and the centerline of rear bearing 175. As will be appreciated by those of ordinary skill, if the disabled vehicle exerts a force "F" at point "A" (on arm 152 at the centerline of wheel 28), the downward force acting at b2 (the midpoint of bearing 175) is equal to F plus the upward force acting at b1 (the midpoint of bearing 173). Thus, Fb2=Fb1+ F. Also, (Fb1)(X)=(F)(Y). As can be seen, therefore, the greater the spacing "X" between the bearings, the less force that is exerted on front bearing 173 during towing of the disabled vehicle. In one preferred embodiment, X is about 3.25 inches, while Y is about 20 inches.

It will now be appreciated that use of the present invention permits the crossbar to rotate vertically as well as horizontally. This permits a reduction in the stress placed on the recovery vehicle, and its disabled-vehicle-engaging components. It will be understood that this stress reduction is particularly advantageous during the towing of vehicles over rough terrain, at uneven speeds, or under other conditions when towing stresses are maximized.

Figure 12:
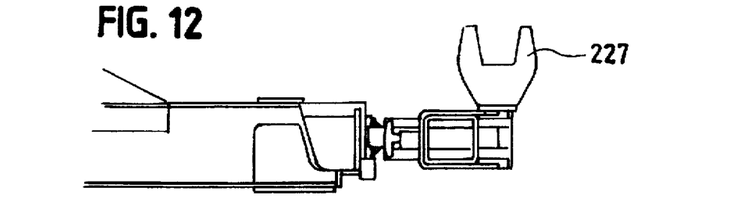
FIG. 12 is a partial side view of the boom of the present invention, illustrating its connection to a crossbeam with lifting forks.
Figure 13:
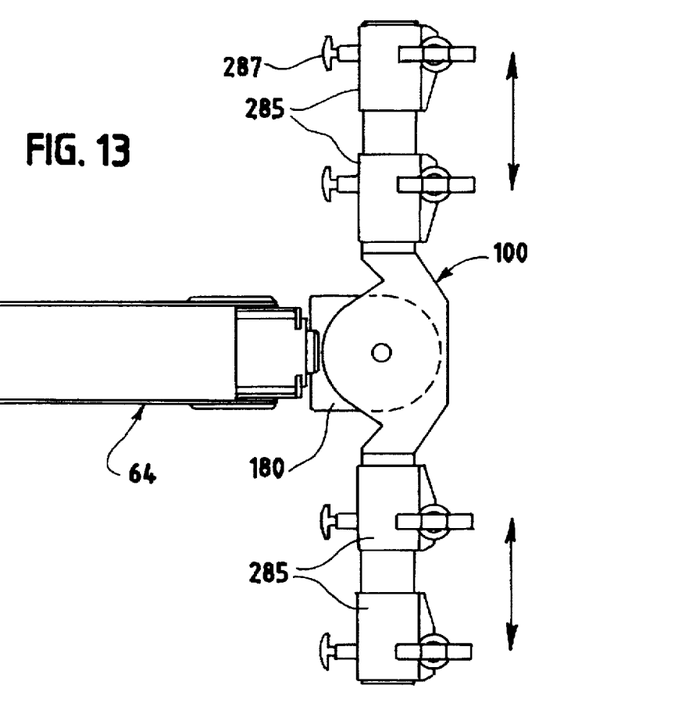
FIG. 13 is a top view similar to FIG. 12 showing how the lifting forks can be slid along the crossbeam by using sliding fork holders.
Figure 14:
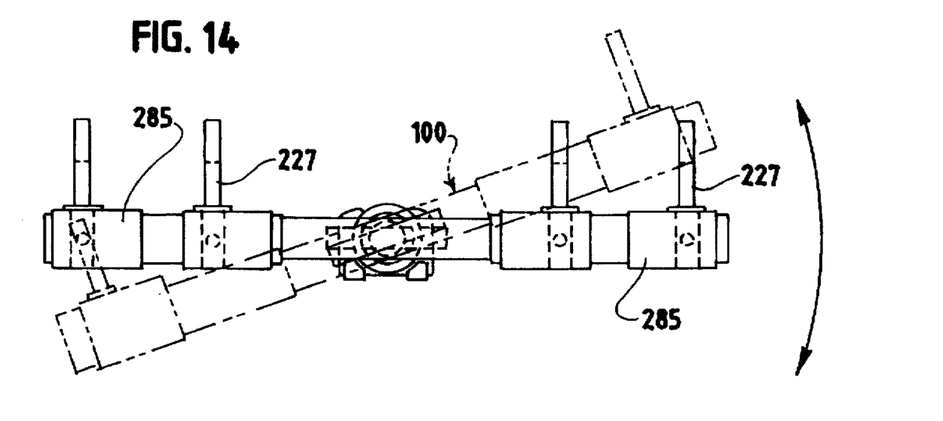
FIG. 14 is a front view similar to FIG. 12 illustrating the rotation of the crossbeam in a vertical plane.

It will also be appreciated that the present invention can be used with a variety of recovery vehicles, and a variety of vehicle engaging devices such as wheel lifts and lifting forks. Referring to FIGS. 12–14, a preferred embodiment of the present invention illustrating the use of lifting forks is shown. Sliding fork holders 285 can be moved along crossbeam 100, in the direction of the arrows in FIG. 13, by withdrawing spring-loaded handle 287, which is connected to a pin that engages corresponding, spaced aperatures (not shown) passing through the crossbeam.

As shown in FIG. 12, even when lifting forks 227 are used, the bottom edge of the "Y"-shaped portion of the lifting fork is approximately level with the top surface of the crossbeam (which is itself coplanar with the stinger), permitting the fork to engage a disabled vehicle at a position substantially near the ground.

When the vehicle engaging mechanism chosen for use with the present invention is a wheel lift, the wheel lift is preferably of the type disclosed in the '623 and '509 patents, as now described. FIG. 2 shows towing apparatus 35 mounted on a truck chassis 30 shown in phantom. The telescoping action of column 44 raises the towed vehicle 25, and the pivoting action of column 44 allows the wheel support structure described there to be moved to accommodate surfaces displaced from or at an angle to the surface on which truck 20 rests. Also, the pivoting and telescoping motions of column 44 cooperate to place the wheel support structure in as nearly a horizontal plane as possible when vehicle 25 is lifted.

Referring still to FIG. 2, wheel support structure 90 is positioned and supported by stinger or boom 60, which is rigidly attached to the lower end of inner member 48. Boom 60 has a hollow outer boom member 62 slidably enclosing an inner boom member 64. Movement of inner boom member 62 thus increases or decreases the length of boom 60. The telescoping movement of boom 60 thus permits the wheel lift structure 90 to be extended under towed vehicle 25 in contact with wheels 28; after the towed vehicle is engaged, retracting boom 60 moves towed vehicle 25 closer to truck 20. This in turn reduces the moment created by towing apparatus 35 about the rear axle 42 of truck 20.

While the telescoping of column 44 and boom 60 can be accomplished by a variety of means apparent to those skilled in the art, FIG. 2 illustrates one preferred embodiment, in which hydraulic actuators 70 are operatively associated with outer and inner members 46 and 48, and with outer and inner boom members 62 and 64, respectively.

The wheel support structure 90 shown in FIG. 2 generally includes a transverse support beam or crossbeam 100, collars 120 and wheel supports 150. Crossbeam 100 is pivotally attached to boom 60 as explained above. Crossbeam 100 thus pivots about an axis lying in the plane containing the long axes of column 44 and boom 60, through an arc extending to either side of a line coincident with the extended axis of boom 60. Crossbeam 100 may be locked in any desired position with respect to boom 60 by any of a variety of means known in the art and not shown here. The ability to pivot crossbeam 100 with respect to boom 60 insures that towed vehicle 25 has a turning radius equal to or smaller than that of truck 20. Pivoting of crossbeam 100 also allows towing apparatus 35 to be used even though truck 20 is at an angle to vehicle 25. Crossbeam 100 is also extended or retracted with the telescoping of boom 60. A shoe 107 (similar in function to sliding fork holders 285) is slidably mounted on each end of crossbeam 100, and can be manually moved and locked by means not shown at intervals along the long axis of crossbeam 100. Accordingly, the effective length of crossbeam 100 can be adjusted to suit towed vehicles of different track widths.

As can be seen in FIG. 2, the wheel lift structure disclosed in the '623 and '509 patents permits crossbeam 100 to be located immediately adjacent the ground during engagement of the towable vehicle.

Still referring to FIG. 2, each shoe 107 supports a tapering collar 120 pivotally attached to its upper surface. Alternatively, collar 120 can be positioned on the side of shoe 107. Pivoting of collars 120 allows wheel support arms 150 to be independently rotated through a horizontal plane. Collars 120 pivot independently, and can pivot through an arc of 360° by mounting collars 120 on a baseplate 122. Arms 152 are preferably offset or bowed, and each end of arm 152 mounts a wheel retainer 154 (a curved plate) on the concave side of arm 152.

The term "collars" as used here is intended to encompass any structure which can be pivotally attached to the crossbeam, and which can be engaged to wheel support arms 150, and permit arms 150 to be rotated in a horizontal plane. Thus, while collars 120 as shown in FIG. 2 are "closed" and tapering, those of skill in the art will recognize both from that drawing and from the disclosure here that various other collars, including "open" or partially open collars (e.g., collars that have gaps or openings about their side periphery), as well as non-tapering collars, can be employed to advantage with the present invention.

It will be appreciated by those skilled in the art that various changes and modifications can be made to the illustrated embodiments without departing from the spirit of the present invention. For example, virtually any type of vehicle engaging device can be used with the present invention. Those of ordinary skill in the art will also recognize that there are various, readily available and publicly known structural equivalents, not disclosed here, to the vertical pivot assembly 130 described here. These, as well as other modifications and changes within the spirit and scope of the present invention, are intended to be covered by the appended claims.

I claim:

1. A wheel lift apparatus associated with a towing vehicle for use in lifting and towing a towable vehicle, comprising:

a longitudinal boom extending rearwardly from the towing vehicle;

a support beam positionable below the towable vehicle and extending transversely to and substantially coplanar with the boom, the support beam having wheel engaging members located at opposite ends of the support beam;

first and second pivot assemblies rotatively connecting the boom to the support beam, the first pivot assembly permitting the support beam to rotate about a horizontal axis substantially collinear with the boom, and the second pivot assembly being permanently located in substantially the same horizontal plane as the first pivot assembly and permitting the support beam to rotate about a vertical axis; and wherein the wheel engaging members can engage the towable vehicle in a towing position and the support beam can be rotated about the horizontal and the vertical axes while the support beam is positioned below the towable vehicle, the vehicle engagement being maintained as the towable vehicle rotates about its longitudinal axis during towing.

2. The apparatus of claim 1, further comprising a vehicle engaging device, including at least two lifting forks, associated with the support beam.

3. The apparatus of claim 1, wherein the second pivot assembly includes a vertical pin connecting the support beam and a portion of the first pivot assembly, and the vertical pin is located substantially near a centerline bisecting the length of the support beam.

4. The apparatus of claim 1, wherein the support beam includes opposing end portions, and the vertical axis intersects the support beam approximately midway between the opposing end portions.

5. The apparatus of claim 1, wherein the first pivot assembly is integrally constructed with the boom.

6. The apparatus of claim 1, further comprising a plate for supporting the support beam, the support plate being operatively connected to both the first and second pivot assemblies.

7. The apparatus of claim 1, further comprising at least one stop associated with a rear portion of the longitudinal boom for limiting the rotational movement of the support beam about the horizontal axis.

8. The apparatus of claim 1, wherein the support beam is positionable immediately adjacent the ground during engagement of the towable vehicle.

9. The apparatus of claim 1, wherein the wheel engaging members comprise:

two wheel support members, each having an elongated arm and a wheel retainer; and two collars for mounting the wheel support members to opposing end portions of the support beam such that the arms are in a generally horizontal orientation, and for generally horizontally rotating the wheel support members from a laterally remote position spaced outwardly from the sides of the towable vehicle to a vehicle lifting position immediately adjacent to the outer sides of a pair of wheels on the towable vehicle.

10. The apparatus of claim 9, wherein the collars each taper from their forward end to their rear end, and each collar is pivotally connected to the opposing end portions of the support beam, and wherein the arms of the wheel support members are slidably engageable and vertically movable within the collars.

11. The apparatus of claim 1 wherein the first pivot assembly is integrally constructed with the boom.

12. The apparatus of claim 1, wherein the crossbeam can be pivoted in a vertical plane about an axis substantially colinear with the boom, and can also be pivoted in a horizontal plane about an axis substantially coplanar with the plane intersecting the boom and the first and second pivot assemblies.

13. The crossbeam of claim 1, wherein the horizontal axis is substantially colinear with the boom, and the first and second pivot assemblies are located in substantially the same horizontal plane.

14. A wheel lift apparatus associated with a towing vehicle for use in lifting and towing a towable vehicle, comprising:

a longitudinal boom extending rearwardly from the towing vehicle;

a support beam positionable below the towable vehicle and extending transversely to and substantially coplanar with the boom, the support beam having wheel engaging members located at opposite ends of the support beam for engaging the towable vehicle, the support beam being positionable immediately adjacent the ground during engagement of the towable vehicle; and first and second pivot assemblies rotatively connecting the boom to the support beam, the first pivot assembly permitting the support beam to rotate about a horizontal axis substantially collinear with the boom, and the second pivot assembly being permanently located in substantially the same horizontal plane as the first pivot assembly and permitting the support beam to rotate about a vertical axis; and wherein the wheel engaging members can engage the towable vehicle in a towing position and the support beam can be rotated about the horizontal and the vertical axes while the support beam is positioned below the towable vehicle, the vehicle engagement being maintained as the towable vehicle rotates about its longitudinal axis during towing.

15. A wheel lift apparatus associated with a towing vehicle for use in lifting and towing a towable vehicle, comprising:

a longitudinal boom extending rearwardly from the towing vehicle;

a support beam positionable below the towable vehicle and extending transversely to the longitudinal boom, the support beam having wheel engaging members located at opposite ends of the support beam;

at least one vehicle engaging device associated with the support beam for engaging the towable vehicle;

a first pivot assembly integrally constructed with the support beam, rotatively connecting the longitudinal boom and the support beam, and extending rearwardly from the boom in a direction substantially collinear with the boom, the first pivot assembly comprising:

(i) a support plate for mounting the support beam, the support plate connected to a shaft, and the shaft being rotatively connected to a rear portion of the boom;

(ii) at least two spaced bearings; and (iii) a housing located at a rear portion of the boom and at least partially enclosing the shaft and the bearings; and a second pivot assembly associated with the support beam and operatively connected to the support plate, the first and second pivot assemblies being permanently located in substantially the same horizontal plane, wherein the first pivot assembly permits the support beam to rotate in a vertical plane, and the second pivot assembly permits the support beam to rotate in a horizontal plane; and wherein the wheel engaging members can engage the towable vehicle in a towing position and the support beam can be rotated about the horizontal and the vertical axes while the support beam is positioned below the towable vehicle, the vehicle engagement being maintained as the towable vehicle rotates about its longitudinal axis during towing.

16. The apparatus of claim 15, wherein each of the at least two spaced bearings are spherical, and the bearings cooperate within the housing to enhance the ability of the first pivot assembly to withstand axially and radially directed forces generated by the towable vehicle and transferred through the at least one vehicle engaging device to the support beam.

17. The apparatus of claim 15, wherein the support beam can be pivoted in a vertical plane about an axis substantially collinear with the boom, and can also be pivoted in a horizontal plane about an axis substantially coplanar with the plane intersecting the boom and the support plate.

18. A wheel lift apparatus associated with a towing vehicle for use in lifting and towing a towable vehicle, comprising:

a longitudinal boom extending rearwardly from the towing vehicle;

a support beam positionable below the towable vehicle and extending transversely to and substantially coplanar with the boom, the support beam having wheel engaging members located at opposite ends of the support beam;

first and second pivot assemblies rotatively connecting the boom to the support beam, the first pivoting means permitting the support beam to rotate about a horizontal axis substantially collinear with the boom, and the second pivoting means being permanently located in substantially the same horizontal plane as the first pivoting means and permitting the support beam to rotate about a vertical axis; and wherein the wheel engaging members can engage the towable vehicle in a towing position and the support beam can be rotated about the horizontal and the vertical axes while the support beam is positioned below the towable vehicle, the vehicle engagement being maintained as the towable vehicle rotates about its longitudinal axis during towing.

* * * * *